United States Patent

Smythe

Patent Number: 5,372,107
Date of Patent: Dec. 13, 1994

[54] ROTARY ENGINE

[76] Inventor: Richard C. Smythe, 12 Cooran Court, Noosa Heads, Queensland 4567, Australia

[21] Appl. No.: 946,468

[22] PCT Filed: May 10, 1991

[86] PCT No.: PCT/AU91/00195

§ 371 Date: Jan. 8, 1993

§ 102(e) Date: Jan. 8, 1993

[87] PCT Pub. No.: WO91/18193

PCT Pub. Date: Nov. 28, 1991

[30] Foreign Application Priority Data

May 11, 1990 [AU] Australia ............................ PK0096

[51] Int. Cl.$^5$ ............................................. F02B 55/16
[52] U.S. Cl. .................................... 123/244; 418/187
[58] Field of Search ................. 123/244; 418/187, 188

[56] References Cited

U.S. PATENT DOCUMENTS

| | | | |
|---|---|---|---|
| 1,944,956 | 1/1934 | Thomas | 123/244 |
| 3,883,276 | 5/1975 | Hofbauer | |
| 3,894,519 | 7/1975 | Moran | |
| 3,960,117 | 6/1976 | Kammerer | 418/187 |
| 4,239,027 | 12/1980 | Lay | 123/244 |

FOREIGN PATENT DOCUMENTS

| | | | |
|---|---|---|---|
| 953027 | 5/1949 | France | 123/244 |
| 547592 | 4/1932 | Germany | 123/244 |
| 227885 | 1/1925 | United Kingdom | 418/187 |
| 2120727 | 12/1983 | United Kingdom | 418/187 |
| 2133474 | 7/1984 | United Kingdom | 123/244 |
| WO8605841 | 10/1986 | WIPO | |

*Primary Examiner*—Michael Koczo
*Attorney, Agent, or Firm*—DeLio & Peterson

[57] ABSTRACT

A rotary engine having an oval rotor (12) centrally mounted in a cylindrical chamber (11). Cylindrical chamber (11) is partitioned into a number of combustion chambers (40–47) by sliding vanes (48–53B). Rotor (12) is mounted to a partially hollow shaft (21) the shaft (21) extending through respective sidewalls of the cylindrical chamber (11). Rotor (12) is provided with internal passageways to allow exhaust to flow from a combustion chamber (40–47) through an internal passageway and out through the partially hollow shaft (21) and to allow incoming air to flow into a hollow portion (19) within rotor (12) and through a suitable passageway to a port located on the outer periphery of the rotor (12). In this manner, air and exhaust gases can be passed into and from a combustion chamber (40–47) by means of ports in the rotor (12) and the engine does not require external valves. Shaft (21) has a solid end which can be used as an output shaft to drive a fly wheel or the like.

18 Claims, 6 Drawing Sheets

ROTARY ENGINE

FIELD OF THE INVENTION

This invention relates to a rotary engine and in particular to a rotary engine having a rotor mounted in a non-eccentric fashion, a plurality of sliding vanes to define a number of combustion chambers and where the rotor has internal fluid flow pathways to allow air to flow to a combustion chamber and to allow exhaust gases to flow from the combustion chamber.

BACKGROUND ART

Rotary engines are well known and many types of rotary engines have been proposed and developed. In each case the rotary engine includes a rotor (or piston) which rotates about an axis and may adopt some reciprocal motion as well. This is in contrast to a reciprocal piston engine which adopts reciprocal motion only.

Many rotary engines include a rotor which is eccentrically mounted relative to a shaft. The eccentric motion assists in defining the various combustion chambers to allow the engine to operate. A disadvantage with these engines is that the eccentric rotor results in dynamic imbalances being formed in the engine.

Rotary engines like other internal combustion engines require air to be directed to a combustion chamber and exhaust gases to be directed from the combustion chamber. Many rotary engines utilise a conventional valve system where at least one pair of valves locate in each combustion chamber, one valve allowing air to pass into the chamber and a second valve functioning to allow exhaust gases to pass from the chamber. As a rotary engine includes a number of combustion chambers, a large number of valves are required. These valves are usually coupled to respective manifolds and the whole arrangement renders the engine bulky, complex and expensive to manufacture.

Various attempts have been made to improve on the above designs. International patent application WO 86/02698 describes a rotary two-stroke internal combustion engine having a combination of an eccentrically-supported rotor and a number of pistons. The rotor is provided with passageways to allow a combustible gas mixture to enter the combustion chamber from a compression cylinder. Upper portions or the cylinder in which the piston slides include a seal to define various combustion chambers.

Australian patent 550117 describes an orbital engine having a rotor, the rotor including passageways extending therethrough. The passageways function to temporarily store compressed air and to transfer the compressed air rearward of the veins.

Australian patent 592750 discloses a rotary internal combustion engine having a number of hollow vanes which compress air and release air into the combustion chamber. The rotor itself is not provided with passageways.

Australian patent application 40430/78 discloses a system for maximising power from rotary engines. One of the rotary stages comprises a rotor having a passageway extending therethrough. The passageway does not function to feed combustible gases or exhaust combustion gases from the combustion chamber.

U.S. Pat. No. 3,883,276 discloses a rotary internal combustion engine having a rotor mounted on an eccentric shaft within a housing. The housing does not include sliding vanes but instead includes dish-like depressions to accommodate to lobes of the eccentrically-mounted rotor. Fuel enters through the eccentric shaft and exhaust gases are exhausted through ducts in the side housing.

U.S. Pat. No. 3,712,274 discloses a circular rotor mounted in a circular housing. The rotor and housing include recessed portion to form combustion chambers. Fuel enters the combustion chamber through a passageway in the rotor while exhaust gases leave the combustion chamber through passageways extending through cylindrical housing.

U.S. Pat. No. 3,693,600 discloses a rotor eccentrically mounted in a cylindrical housing. Combustion gases flow through a spiral rotor duct and the rotor is driven by the combined action of the jet air orifice, the expansion of the fluid in the combustion chamber and the torque component of tile spiral duct. Exhaust gases are exhausted directly from the cylindrical housing.

U.S. Pat. No. 3,894,519 discloses a rotary combustion engine having an oval rotor within a cylindrical housing. A plurality of vanes are provided to define separate combustion chambers. The rotor is mounted to a shaft which extends through side walls of the cylindrical chamber. Air and fuel enter through one end of the hollow shaft and through passageways in the rotor body to the combustion chamber. Exhaust gases flow from the combustion chamber through a suitable passageway in the rotor body and through the other end of the hollow shaft. The shaft is partitioned into two main segments, one to allow exhaust gases to flow out one end of the shaft and the other to allow the air-fuel mixture to flow into the other end of the shaft. The air-fuel mixture is further separated by a longitudinal partition. In this arrangement, both the air and the exhaust flow through the hollow shaft making it difficult to make one end of the shaft an output shaft for coupling with a gearbox, clutch, fly wheel or like member.

It is an object of the invention to provide a rotary engine which may overcome the above-mentioned disadvantages.

It is a further-object of the invention to provide a rotary engine wherein air and exhaust gases can flow to and from a combustion chamber through pathways in the rotor body while allowing provision of an output shaft to allow the engine to be coupled to a fly wheel, gearbox or like member.

STATEMENT OF INVENTION

In one form, the invention resides in a rotary engine comprising an engine body having a cylindrical chamber, the cylindrical chamber including end walls, an oval rotor comprising a main body, said main body having a pair of opposed side walls and an outer peripheral surface, and a pair of opposed shaft members extending outwardly from a respective side wall, said shaft members being axially aligned relative to each other and extending through a respective end wall of the cylindrical chamber to allow the oval rotor to exhibit rotary motion about a central axis, a plurality of moveable vane members extending between the peripheral surface of the rotor and an internal wall of the cylindrical chamber to define a plurality of separate combustion chambers, characterised in said rotor having a first fluid flow pathway extending through one of said shaft members and through the main body of the rotor to a first port in the peripheral surface of the rotor to allow fluid to pass between the first port and the exterior of the cylindrical chamber, and a second fluid flow pathway extending through a said end wall of the cylindrical chamber and through the main body of the rotor to a second port in the peripheral surface of the rotor to allow fluid to pass between the second port and the exterior of the cylindrical chamber, said first and second fluid flow pathways being separate from each other.

One advantage of having a first fluid flow pathway extending through one of the shaft members and a second fluid flow pathway extending through an end wall of the cylindrical chamber is that the other shaft member need not include a fluid passageway and therefore can be used as an output shaft to couple the engine to a gearbox, clutch or fly wheel without the requirement of a complicated manifold arrangement.

The engine body may be substantially disclike in configuration. The end walls may be separately formed and subsequently attached to the remaining portion of the engine body. Alternatively, the engine body may be formed in two parts, each part defining an end wall and part of the cylindrical chamber.

The oval rotor is suitably dimensioned such that its longer axis is slightly spaced from the interior wall of the cylindrical chamber thereby defining a compression area. The width of the oval rotor may be such to be spaced slightly inwardly from the end walls of the cylindrical chamber. A seal may be provided between the opposed side walls of the oval rotor and a respective end wall of the cylindrical chamber to inhibit leakage of fluid along the side walls of the oval rotor.

The pair of opposed shaft members suitably comprise a single member extending through the oval rotor and from each side wall of the rotor. The single member is suitably hollow along part of its length to define one hollow shaft member and one solid shaft member.

The first fluid flow pathway is suitably defined by the hollow shaft member and a fluid flow passageway extending from the hollow shaft member through the main body of the rotor and to the first port. Suitably, the fluid flow passageway comprises a tube or shaft extending between the hollow shaft member and the first port. A plurality of fluid flow passageways may extend from the hollow shaft to a plurality of first ports.

The second fluid flow pathway may be defined by a recess formed in one or both of the opposed side walls of the rotor, an opening in an end wall of the cylindrical chamber which is in fluid communication with the recess and an opening in the recess communicating with the second port on the outer periphery of the rotor.

Suitably, the recess extends axially through the rotor main body to define a bore with the opening in the end wall of the chamber communicating with the bore.

The opposed side walls of the rotor suitably extend between a respective end of the bore and the peripheral surface of the rotor. A seal may locate between the end face and a respective end wall of the cylindrical chamber.

The arrangement of the first and second ports may vary depending on the type of engine stroke desired. For two-stroke engines, the arrangement of the ports is suitably such that the first and second ports are located adjacent to each other to allow both ports to locate into a combustion chamber. The ports are suitably disposed adjacent the minor axis of the oval rotor. For two-stroke engines, it is preferred that a pair of first and second ports are located on opposed sides of the rotor.

For four-stroke engines, the first and second ports may be spaced from each other to allow the ports to pass through separate combustion chambers.

The first and second ports may be of various configurations to facilitate fluid flow into and from the combustion chamber. Each port may comprise a single opening or a plurality of separate openings.

The vane members may be of any construction to allow separate combustion chambers to be defined. Suitably, the vanes are sliding vanes with each vane locating within a vane housing in the engine body and biased therefrom. The number of vanes may vary depending on the number of combustion chambers desired. The vanes may be odd or even numbered. A suitable engine may comprise six combustion chambers defined by six vanes or eight combustion chambers defined by eight vanes. Other number of veins may be envisaged.

Suitably, the first fluid flow pathway, conveys exhaust gases from a combustion chamber to the exterior of the engine body. If necessary, insulation may be supplied to control heat exchange between the combustion gases and the rotor.

The second fluid flow pathway suitably comprises the intake air mixture and while fuel may be supplied at this point, it is preferred that the second fluid flow pathway contains only air (or an air/oil mixture if the engine works on a 2-stroke cycle).

A fuel injection means is preferably associated with the engine body to inject fuel into a respective combustion chamber. Fuel injection means may be associated with each combustion chamber therefore for an engine having six chambers, six fuel injection means may be provided. The advantage of providing a separate fuel injection means is that the fuel can be controlled to each combustion chamber and under conditions of low power requirement, fuel can be cut off from certain combustion chambers thereby allowing the rotary engine to have variable power output.

The rotary engine may include ignition means to assist in igniting the fuel and air mixture in a combustion chamber. The ignition means suitably is in a form of a spark ignition which may be provided by a spark plug. For fuel/air mixtures which spontaneously combust at a certain pressure/temperature, an ignition means may not be required.

To facilitate removal of heat from the engine, the engine body may be provided with cooling passageways. The passageways are suitably able to convey water or other suitable coolant to assist in heat removal from the combustion area.

The rotor may also be formed with hollow portions to minimise weight and control heat transfer.

BRIEF DESCRIPTION OF THE DRAWINGS

The invention will be better understood by reference to embodiments thereof as illustrated in the accompanying drawings in which.

DETAILED DESCRIPTION OF THE INVENTION

Figure 1:
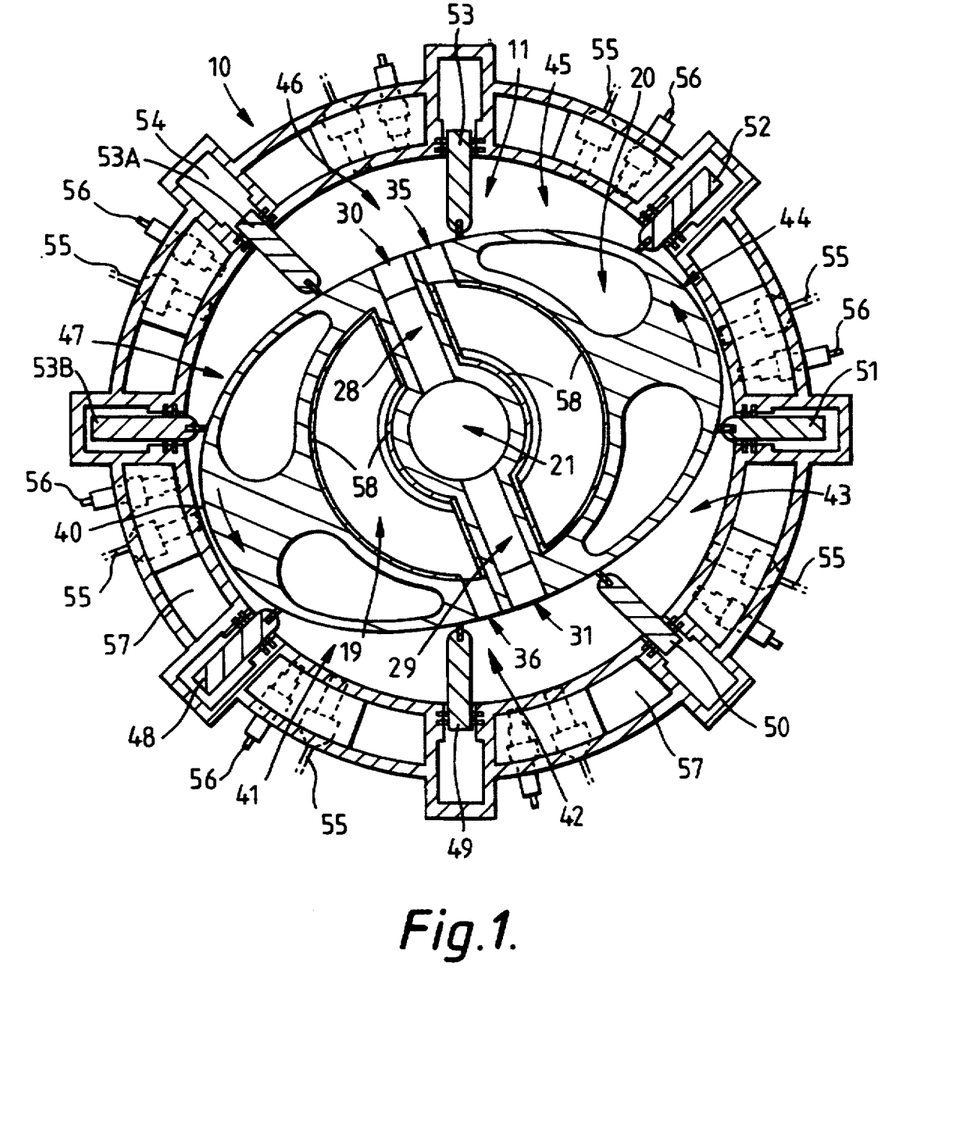
FIG. 1 is a section view of a rotary engine according to the embodiment having eight combustion chambers and suitable for a two-stroke cycle.
Figure 2:
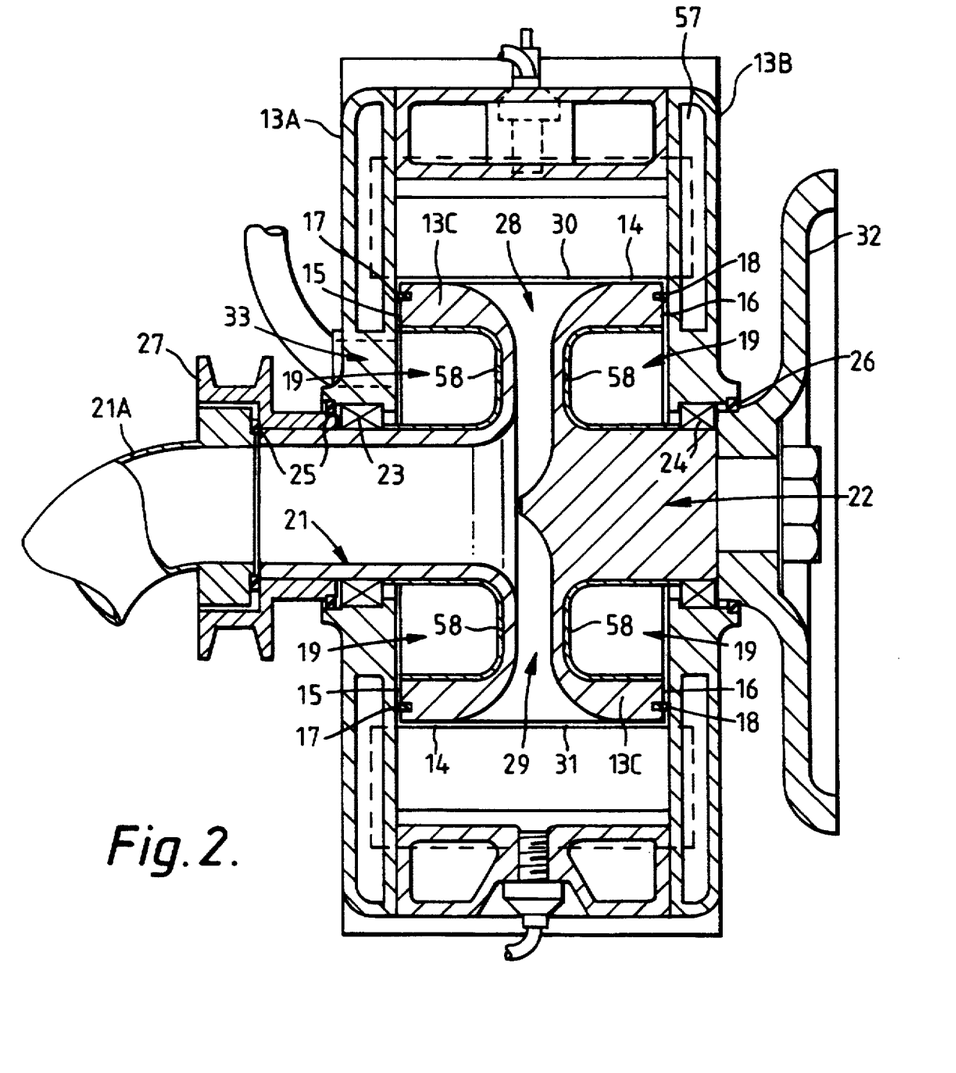
FIG. 2 is a section view of FIG 1.
Figure 5:
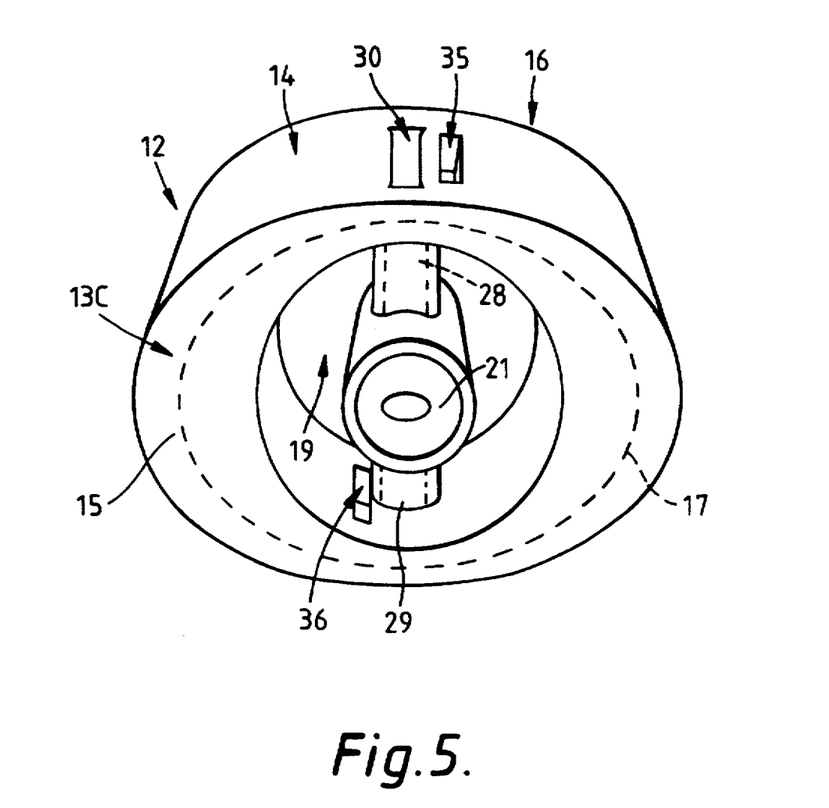
FIG. 5 is a view of a rotor suitable for use in a two-stroke cycle.

Referring to FIGS. 1, 2 and 5 there is disclosed an eight-chambered rotary engine comprising an engine body 10 having a cylindrical chamber 11 formed therein. The cylindrical chamber includes a pair of end walls 13A, 13B (see FIG. 2).

Within cylindrical chamber 11 is located an oval rotor 12. Rotor 12 has a main body 13C (see FIG. 5) which defines an outer peripheral surface 14 which passes through respective combustion chambers. Rotor 12 further include a pair of opposed side walls 15, 16. Sealing rings 17, 18 are located on each side wall to seal the rotor against the internal walls of the cylindrical chamber.

In the embodiment, rotor 12 is provided with a circular bore 19 which extends through the rotor between side walls 15, 16. Rotor 12 may further be provided with hollow portion 20 (see FIG. 1) to minimise the weight of the rotor.

Rotor 12 is mounted for non-eccentric rotation within cylindrical chamber 11 by a pair of shaft member 21, 22 more clearly shown in FIG. 2. In the embodiment, shaft members 21, 22 are formed from a single member with shaft member 21 being substantially hollow and shaft member 22 being solid. Each shaft member passes through a respective end wall 13A, 13B of the engine body and is mounted through a bearing assembly 23, 24 with seals 25, 26 being located adjacent the respective bearing assembly. A pulley wheel 27 is provided about shaft 21 to accommodate a pulley belt to drive auxiliary equipment.

Hollow shaft 21 terminates approximately mid-way through rotor 12 and a pair of fluid flow passageways 28, 29 extend from hollow shaft 21 to respective first ports 30, 31 located on the outer peripheral surface of the rotor. Fluid flow passageways 28, 29 are in the form of hollow tubes (see FIG. 5) which also function to support shaft members 21, 22 to the main body of the rotor.

The first fluid flow pathway is defined by hollow shaft 21, and fluid flow passageways 28, 29 to respective ports 30, 31. In the embodiment, this fluid flow pathway transmits exhaust gases from a combustion chamber to the exterior of the engine body.

Solid shaft 22 can function as an output shaft ant is mounted to fly wheel 32.

An opening 33 is formed through end wall 12 of the cylindrical chamber (see FIG. 2) and is positioned communicate with bore 19. Opening 33 is positioned between one of shafts 21, 22 and seal 17 or 18. Bore 19 is in fluid communication with a pair of second ports 35, 36 (see FIG. 1) through a suitable passageway extending through main body 13C of rotor 12 and between bore 19 and a respective port 35, 36. The second fluid flow pathway is defined by opening 35, bore 19 and the passageway connecting bore 19 to a respective second port 35, 36. In the embodiment, the second fluid flow pathway conveys air to a respective combustion chamber.

Seals 17, 18 in the embodiment are elliptically-shaped and rotate with the rotor and are kept in contact with the flat end plates of end walls 13A, 13B to provide a barrier to the escape of gases from the combustion chambers.

Rotary engine 10 is partitioned into eight combustion chambers 40-47 by eight sliding vanes 48-53A, 53B which extend from the engine housing to be in sliding contact with the outer peripheral surface 14 of rotor 12. The vanes may be provided with a sealing tip which slidingly engages the peripheral surface of the rotor. Each vane may further be provided with seals spaced along each respective side of the vane to allow each vane to slide within a vane housing (i.e. 54) without loss of combustion gas. Each vane is preferably biased to extend from its associated vane housing. Each vane extends across the width of the peripheral surface of the rotor and is in sealing contact therewith.

The constructional details of the vane and the details of their connection to the engine body is not intended to be part of the invention. Prior art illustrates various methods of design or operation of vane technology that may be appropriate or adaptable to the invention.

Between each adjacent pair of vane is located a fuel injector 55 and an ignition plug 56. Again, the type and operation of fuel injector and ignition plug does not form part of the invention.

The engine body may be cooled by allowing coolant to flow through suitable passages 57 extending through the engine body to carry away librated heat.

The inner surfaces of bore 19 may be lined with an insulating material 58 to control heat. exchange between hot exhaust gases passing through the rotor body and air passing through bore 19.

The operation of the engine as illustrated in FIG. 1, 2 and 5 will now be described.

To start the engine, output shaft 22 is caused to be rotated by any external convenient means (such as a starter motor) thereby turning rotor 12 relative to the engine body. At the same time, a super-charger (not shown) is driven by a belt so as to deliver a supply of pressurised air through opening 33 and into bore 19. As rotor 12 is caused to rotate about its central axis, the volume of the combustion chambers defined between adjacent vanes is varied between maximum and minimum volumes with the vanes extending or retracted as directed by the passage of the rotor.

With reference to the two-cycle combustion process, a charge of pressurised air is introduced to an expended combustion chamber by passage from bore 19 through second ports 35, 36. Subsequent revolution of rotor 12 causes second ports 35, 36 to exit the now pressurised combustion chamber. At this stage, fuel is injected into the pressurised combustion chamber by a fuel injector and continued compression of the air-fuel mix is effected by the elliptical shape of the rotor. As the-rotors longitudinal apexes reaches or nears the centre of the chamber a proportion of the air-fuel charge is transferred from a forward area of the chamber to a rearward area of the chamber where it accumulates in the region of the ignition plug. A spark is then provided by the ignition plus to ignite the fuel-air mix. Gas expansion thereby takes place to force rotor 12-to rotate in a anti-clockwise direction as shown in the drawings. This may compressively force the fuel charge remaining in the forward section of the chamber rearwards into the advancing flame front.

Burning of the fuel charge is complete at or just before the moment that the first exhaust port 30 (or 31) passes into the region of the chamber. As this port passes through the chamber, the waste combustion gases pass through it and through hollow shaft 21 to an exhaust conduit 21A.

Scavenging of the waste gases is effected by the flow of pressurised air entering the combustion chamber via the second intake port 35 (or 36) adjacent to the exhaust port. The fresh air in turn charges the combustion chamber to re-commence the cycle.

Referring specifically to FIG. 1, rotor 12 rotates in an anti-clockwise direction as shown by the arrows. FIG. 1 shows chambers 40 and 44 in full compressions, chamber 43 and 47 undergoing powered expansion, while chambers 42 and 46 are undergoing the exhaust function. Chambers 41 and 45 are in the fuel injection and compression phase. In this manner, a balanced operation is provided through each of the cycles.

Figure 3:
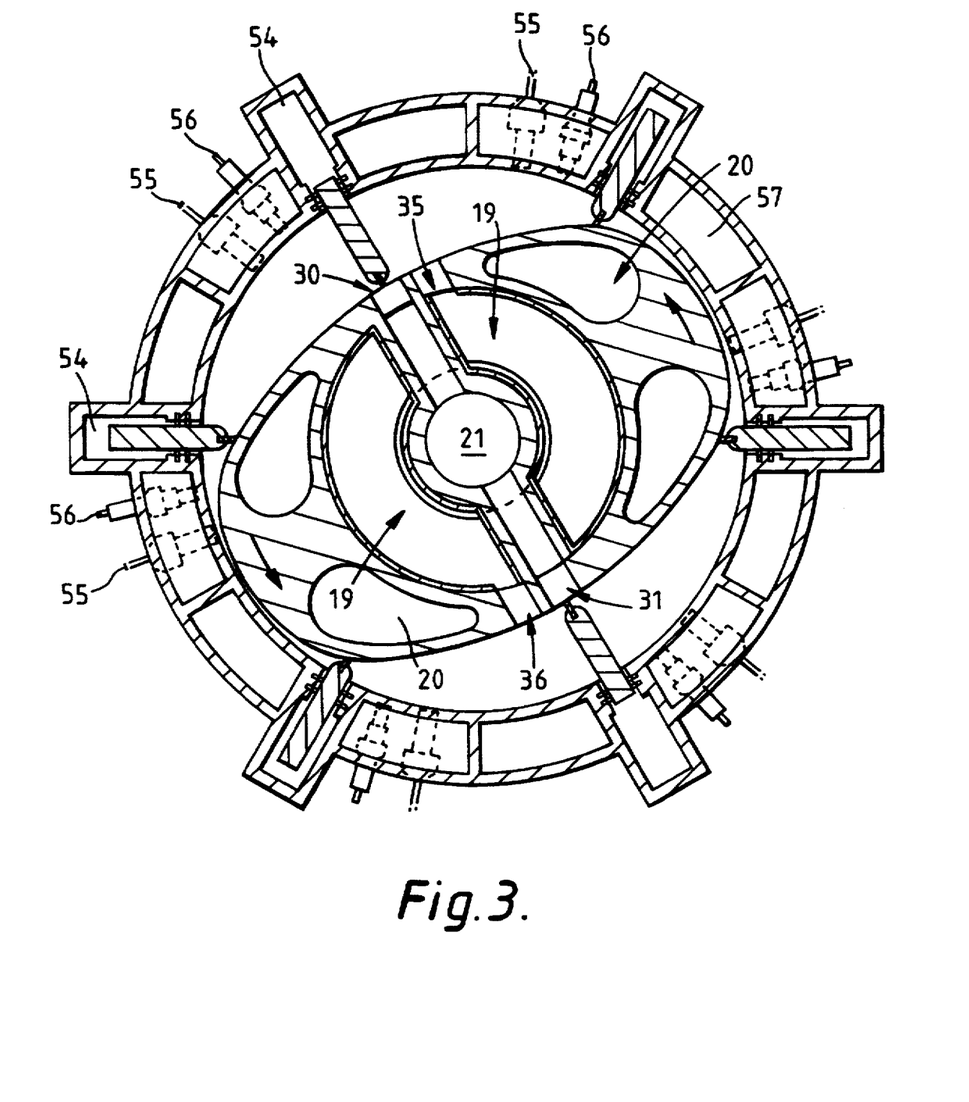
FIG. 3 is a section view of a rotary engine according to an embodiment of the invention having six combustion chambers and suitable for a two-stroke cycle.

FIG. 3 shows a similar engine having six chambers instead of the eight chambers described previously. Like numerals have been used to identify the various components of this embodiment.

In the eight-chambered configuration a compressed chamber at the point of ignition is preceded by a chamber still undergoing powered expansion thereby providing an overlap in power pulses and smoothness in torque delivery. Therefore, it is envisaged that additional chambers may provide further benefits. In the case of a six-chambered configuration, as one compressed chamber is about to fire, its preceding chamber is completing its powered expansion phase. The fly wheel in this case will enable the smooth harnessing of the available torque at the output shaft.

Figure 4:
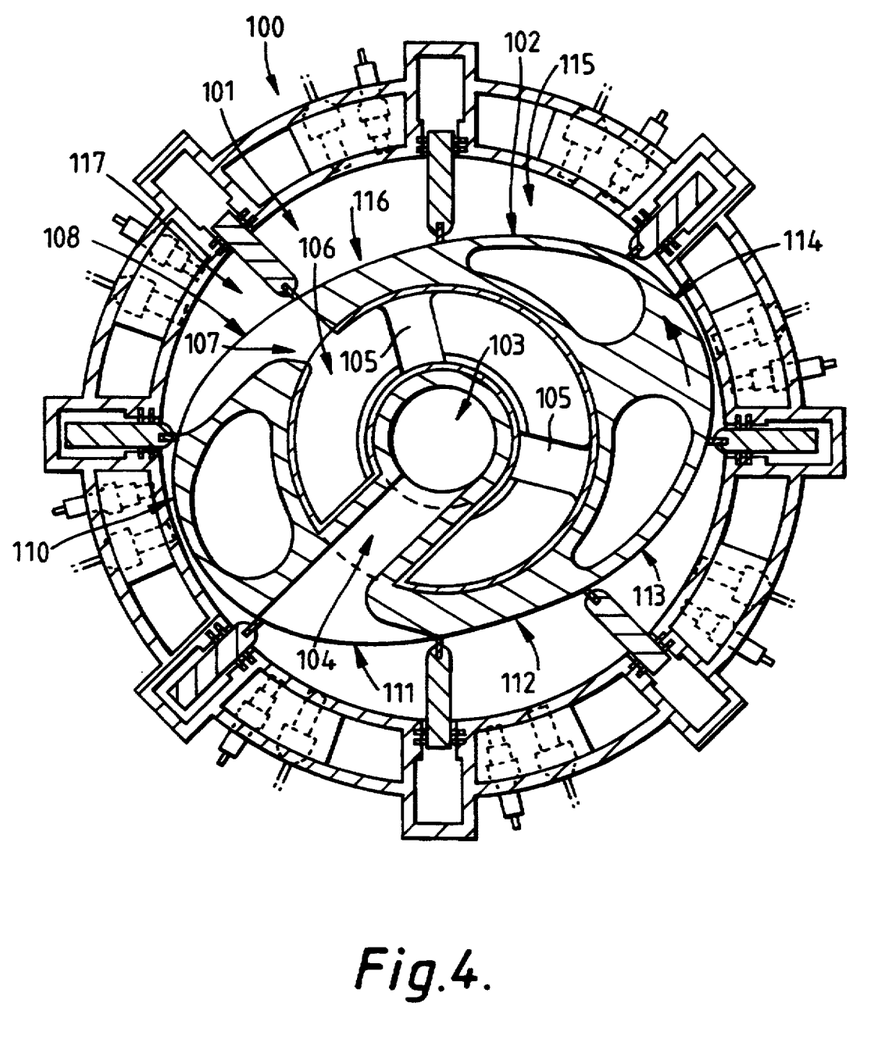
FIG. 4 is a section view of a rotary engine according to an embodiment of the invention having eight combustion chambers and suitable for a four-stroke cycle.

FIG. 4 discloses a rotary engine according to an embodiment of the invention suitable for four-stroke operation. The engine is similar to the above mentioned two-stroke engines in that it comprises an engine body 100 having a cylindrical chamber 101 therein, and oval rotor 102 is mounted in the chamber in a manner analogous to that described above. Cylindrical chamber 101 is partitioned into eight combustion zones by eight sliding vanes in a manner analogous to that described above with reference to the eight-chambered two-stoke cycle engine. Rotor 102 includes a partially hollow central shaft 103 similar to that described above. Shaft 103 however includes a single fluid flow pathway 104 connecting hollow shaft 103 to a first port 105. To support shaft 103 in this configuration, reinforcing struts 105 are spaced between shaft 103 and the internal wall of bore 106 extending through rotor 103. Combustion gases flow through first port 105, through passageway 104 and out through hollow shaft 103 to an exhaust system (not shown).

As with the two-stroke engine described above, air can pass into bore 106 through an opening in an end wall of the engine body (not shown). A fluid flow pathway 107 extends between bore 106 and a second port 108 to allow air to pass from 106 to the interior of a particular combustion chamber.

The operation of the four-stoke engine will now be described. As shown in FIG. 4, chambers 110 and 114 are in full compression while chambers 112 and 116 are at maximum volume. Chambers 111 and 115 are undergoing compression while chambers 113 and 117 are undergoing expansion. As the rotor turns in the direction indicated by the arrow, air is introduced from bore 106 through passageway 107 to second port 108 and into an expanding chamber 117. After full expansion has occurred (chamber 116), fuel is injected into the chamber through a fuel injector (shown in phantom) and the chamber is compressed by further rotation of the elliptical rotor.

On attaining full compression (chamber 114) of the fuel charge, a spark is provided by the ignition plug (shown in phantom). Gaseous expansion forces the rotor to turn in the direction indicated until maximum expansion is reached whereupon the exhaust slot (first port 105) is rotatably passed into expanded chamber 111.

Upon further rotation, exhaust gases are compressively expelled from the chamber by the rotor and are forced through the exhaust tube through hollow shaft and to an exhaust conduit to the atmosphere.

In this manner, the Otto cycle of compression ignition expansion and exhaust is carried out sequentially in each of chambers 110-117 in what is recognised as a four-stroke operation of an internal combustion engine.

It should be appreciated that the engine may function successfully without fuel injectors and air and fuel may be supplied from an external device such as a carburettor directly to bore 106 the air-fuel mixture may be introduced into an expanding chamber or may be forced into the chamber by pre-compression of the mix (i.e. by super-charger or the like).

It should be appreciated that due to the non-eccentric motion of the rotor, certain chambers can be excluded from the combustion cycle operations when power requirements of the engine are low.

By way of example, the eight-chamber configuration can be electronically managed to allow only one combustion operation of each chamber per revolution of the rotor. This could be achieved by firing the-combustion chambers as shown in FIG. 1 in the order of chamber 40, 45, 42, 47, 44, 41, 46 and 43. In this firing order torque will still be continuously applied to the rotor.

Similarly, in a six equal chambered configuration where consecutive chambers are nominated anti-clockwise as A, B, C, D, E, F and with anti-clockwise rotor motion, the engine may be managed to provide power strokes to the rotor in the firing order A, E, C, A, E, C. Thereby, six power pulses are effective per revolution of the rotor as opposed to twelve per revolution when all six chambers are activated.

This capability to effect variable ignition and operate in volume capacity provides inherent advantages in terms of fuel economy and exhaust emissions.

It should also be appreciated that two or more rotors of the general description above could be coupled together to allow a larger number of combustion chambers to be formed in the engine body.

Figure 6:
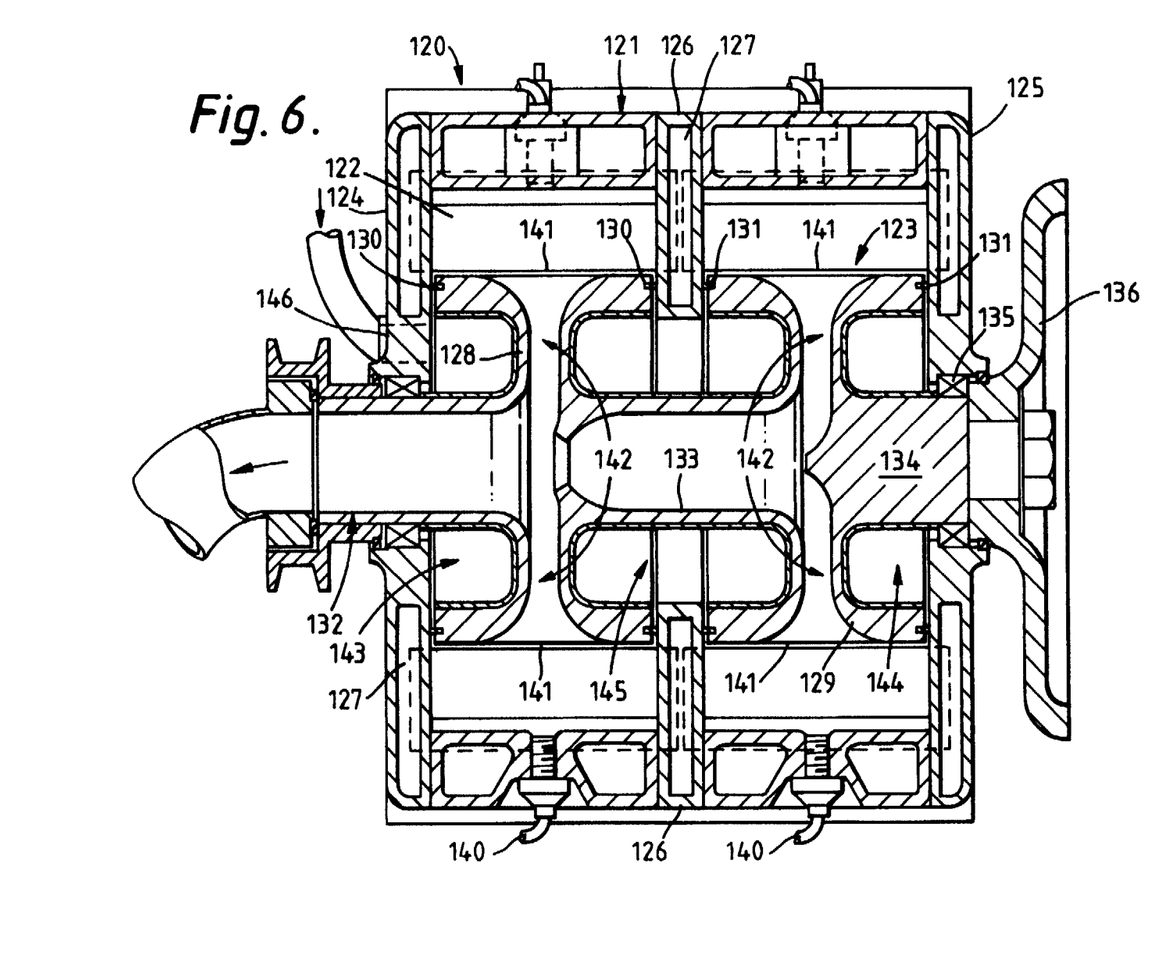
FIG. 6 is a section view of an engine including a pair of rotors coupled together.

An embodiment of the invention including a pair of rotors coupled together as shown in FIG. 6.

In this figure there is disclosed a rotory engine 120 having an engine body 121 formed with two cylindrical chambers 122, 123. Each of cylindrical chambers 122, 123 includes an end wall 124, 125 and the cylindrical chambers are partitioned by an intermediate wall 126. These walls include passageways 127 to allow coolant to flow through this area to remove heat from the system.

The engine includes two oval rotors 128, 129 each rotor rotating within its respective cylindrical chamber. Rotors 128, 129 are similar in design to that described above having seals 130, 131 to seal the rotor against end walls of the respective cylindrical chamber. A number of vanes are provided in the cylindrical chamber to partition the chamber into a number of combustion zones as described above. Rotor 128 is supported by a hollow shaft 132 and rotor 129 is supported by a partially hollow shaft having a hollow portion 133 and a solid portion 134. Solid portion 134 passes through a suitable opening in end wall 125 and is supported by bearing 135 for rotation. Shaft 134 can be considered as the output shaft and is coupled to fly wheel 136.

Shaft 132 and shaft portions 133, 134 are formed from a single member thereby axially positioning rotors 128 and 129 relative to each other. As described above, each of the combustion chambers is provided with a fuel injection means 140 and an ignition plug (not shown).

Exhaust gases pass from a respective combustion chamber through a first port 141 on the respective rotor 128, 129 and through an associated passageway 142, through hollow shaft 132 and to an exhaust system (not shown).

Rotors 128, 129 are formed with bores 143, 144 extending through each rotor body with the bores being in communication with each other at 145. An opening 146 is provided through end wall 124 to allow air to pass into bore 143 and thus to bore 144. In this manner, a single opening 146 will allow air to extend through the respective bores of both rotors. A multiplicity of air intakes can also be utilized if large volumes of air are required.

In a manner similar to that described above, each bore 143, 144 communicates with a second port through a suitable passageway (not shown) to allow air to pass to a combustion chamber.

In an alternative, each of rotors 128, 129, may be formed with separate bores 143, 144 which are not in communication with each other and in this alternative an air intake may extend through intermediate partition 126 with openings extending to both bores. Partition 126 is modified to be in sealing engagement with shaft portion 133 to define the separate bores.

As both rotors are coupled together, they will impart their rotational force to the common shaft thereby improving output performance.

It should be appreciated that other changes can be made. For instance the rotors may be aligned in a non-parallel fashion about the shaft such that in operation, their individual Otto cycle functions occur at different or alternative moments during each revolution. In this (out of phase) manner, an overlap of the Otto cycle functions will occur in each rotor thereby providing balance and permutational advantages if the dual-rotor engine is operating on a reduced number of igniting combustion chambers per revolution as described above.

Also alternatively, the rotors may be aligned parallel as illustrated in FIG. 6 and rotate in a synchronous manner while in construction, the housing, vanes and associated devices of the second rotor may be rotated a number of degrees in relation to the housing of the first rotor so as to achieve an operational overlap of each rotor function as described above.

Furthermore, in a further alternative the fuel injector means may be located in association with intermediate partition 126 such that one fuel injector may provide fuel to two adjacent chambers.

By having one central exhaust tube, a turbine can be coupled to the exhaust tube to add directly to shaft output power.

By having a continuous rotary motion, there is minimal pulsing of the exhaust gases (as opposed to reciprocating piston engines). The incoming air passes through the rotor body and can assist in cooling the rotor. The incoming air can also be pre-heated by heat exchange with the hot exhaust gases.

The rotary engine according to the invention with eight chambers each with two power strokes per revolution of the rotor shaft can run at much lower speed than conventional reciprocating two-stroke engines. Conventional engines with one power stroke per output shaft revolution per cylinder, with four cylinders, will achieve four power strokes per revolution. The rotary engine will achieve sixteen power strokes per revolution and consequently may run at one-quarter of the speed for the same power. The maximum speed of an eight-chamber rotary engine and two-stroke operation can therefore be set at about fifteen hundred rpm. The attaining of additional speed of rotor revolution will provide additional power output.

It is envisaged that a rotary engine might have an internal housing diameter of 220 min. Overall engine outer diameter may be in the order of 360 min. A suitable combustion chamber would be 35 mm deep at maximum displacement, 55 mm wide between vanes and 55 mm deep in the direction of the rotor axis. This can provide a maximum volume of 106 cc per chamber and a compression volume of 75 cc. The air intake volume under super-charge conditions for combustion can be $16 \times 75$ cc, i.e., 1,200 cc per rotor revolution. For higher octane fuels a degree of super-charging would be required. The engine has a potential to develop 30 kw net at 1,500 rpm or twin adjacent rotors could be used to achieve a power of 60 kw.

According to the invention with six chambers and of similar internal housing diameter, the respective chambers are larger than those of the eight chamber version therefore they may be wider. The greater chamber volume achieved will thereby allow the combustion of more fuel per revolution of the rotor hence the development of more power.

It should be appreciated that various other changes and modifications may be made to the embodiment without departing from the scope of the invention as defined in the appended claims.

I claim:

1. A rotary engine, comprising an engine body having a cylindrical chamber, the cylindrical chamber including end walls, an oval rotor comprising a main body, said main body having a pair of opposed side walls and an outer peripheral surface, and a pair of opposed shaft members extending outwardly from a respective side wall, said shaft members being axially aligned relative to each other and extending through a respective end wall of the cylindrical chamber to allow the oval rotor to exhibit rotary motion about a central axis, a plurality of moveable vane members extending between the peripheral surface of the rotor and an internal wall of the cylindrical chamber to define a plurality of separate combustion chambers, the vane members being supported by a housing which forms the cylindrical chamber, characterized in that the rotor has an exhaust pathway extending through only one of said shaft members and through the main body of the rotor and to an exhaust port in the peripheral surface of the rotor to allow exhaust to pass from the exhaust port to the exterior of the cylindrical chamber, and an inlet pathway extending through one of said end walls of the cylindrical chamber and spaced from the pair of opposed shaft members, the inlet pathway extending through the main body of the rotor to an inlet port in the peripheral surface of the rotor to allow inlet fluid to pass from the exterior of the cylindrical chamber to the inlet port, the exhaust and inlet flow pathways being separate from each other.

2. The engine as claimed in claim 1, wherein one of said shaft members is substantially hollow to define part of the exhaust pathway and the other of said shaft members is substantially solid and does not define part of the exhaust or inlet pathways.

3. The engine as claimed in claim 2, wherein said first and second shaft members comprise a single member which is hollow along part of its length to define one hollow shaft member and one solid shaft member.

4. The engine as claimed in claim 3, wherein part of the exhaust passageway extends between the hollow shaft member and the exhaust port.

5. The engine as claimed in claim 4, comprising a pair of exhaust passageways extending between the hollow shaft member and a pair of exhaust ports.

6. The engine as claimed in claim 1, wherein the oval rotor includes a recess formed in at least one of the opposed side walls of the rotor, the recess forming part of the inlet pathway.

7. The rotor as claimed in claim 6, wherein said recess extends axially through the rotor to form a bore.

8. The engine as claimed in claim 7, wherein said rotor includes part of the inlet passageway extending between the bore and the second port.

9. The engine as claimed in claim 8, wherein said rotor includes a pair of said inlet passageways extending between the bore and a pair of second ports.

10. The engine as claimed in claim 7, including an opening in one of said end walls of the engine body which is in communication with the bore.

11. The engine as claimed in claim 1, wherein the exhaust port and inlet port are spaced adjacent relative to each other such that both ports may communicate with a common combustion chamber.

12. The engine as claimed in claim 1, wherein the exhaust port and inlet port are spaced from each other whereby said ports communicate with different combustion chambers.

13. The engine as claimed in claim 11, wherein the exhaust port and the inlet port are positioned adjacent the minor axis of the rotor.

14. The engine as claimed in claim 1, including fuel injection means communicating with one or more of the separate combustion chambers.

15. The engine as claimed in claim 1, comprising duel ignition means communicating with one or more or the separate combustions chambers.

16. The engine as claimed in claim 1, comprising between six to eight combustion chambers.

17. The engine as claimed in claim 16, wherein each of said combustion chambers includes a fuel injection means and an ignition means.

18. The engine as claimed in claim 1, comprising a plurality of said rotors each rotating within a respective said cylindrical chamber and coupled to a common shaft.

* * * * *

UNITED STATES PATENT AND TRADEMARK OFFICE
CERTIFICATE OF CORRECTION

PATENT NO. : 5,372,107

DATED : December 13, 1994

INVENTOR(S) : Smythe

It is certified that error appears in the above-indentified patent and that said Letters Patent is hereby corrected as shown below:

Column 2, line 17: "tile" should read -'-the- -.

Column 5, line 20: "include" should read - -includes- -.

Column 5, line 27: "portion" should read - -portions- -.

Column 5, line 30: "member" should read - -members- -.

Column 5, line 54: "ant" should read - -and- -.

Column 5, line 57: After the word "positioned" insert - -to- -.

Column 6, line 32: After the word "heat" delete - -.- -.

Column 6, line 57: After the third "the" delete the hyphen.

Column 6, line 64: After "12" delete the hyphen.

Column 8, line 35: After the word "the" delete the hyphen.

Column 10, line 22: "min." should read - -mm.- -.

Column 10, line 23: "min." should read - -mm.- -.

Column 10, line 64: After "chamber," it should start a new sub claim indention.

Column 12, line 18: "11" should read - -1- -.

Column 12, line 24: "duel" should read - -fuel- -.

UNITED STATES PATENT AND TRADEMARK OFFICE
CERTIFICATE OF CORRECTION

PATENT NO. : 5,372,107
DATED : December 13, 1994
INVENTOR(S) : Smythe

It is certified that error appears in the above-indentified patent and that said Letters Patent is hereby corrected as shown below:

Column 12, line 25: The second "or" should read - -of- -.

Column 12, line 26: "combustions" should read - -combustion- -.

Signed and Sealed this

Fourteenth Day of March, 1995

*Attest:*

BRUCE LEHMAN

*Attesting Officer*         *Commissioner of Patents and Trademarks*